United States Patent
Atwell et al.

(10) Patent No.: US 10,699,345 B2
(45) Date of Patent: Jun. 30, 2020

(54) SYSTEM FOR DYNAMICALLY CUSTOMIZING PRODUCT CONFIGURATIONS

(71) Applicant: Hartford Fire Insurance Company, Hartford, CT (US)

(72) Inventors: Michael F Atwell, Cromwell, CT (US); Laura O'Connor Hanson, Manchester, CT (US); Stephen M. Jones, East Hampton, CT (US)

(73) Assignee: Hartford Fire Insurance Company, Hartford, CT (US)

( * ) Notice: Subject to any disclaimer, the term of this patent is extended or adjusted under 35 U.S.C. 154(b) by 467 days.

(21) Appl. No.: 14/505,757

(22) Filed: Oct. 3, 2014

(65) Prior Publication Data
US 2016/0098800 A1  Apr. 7, 2016

(51) Int. Cl.
*G06Q 40/00* (2012.01)
*G06Q 40/08* (2012.01)

(52) U.S. Cl.
CPC .................................. *G06Q 40/08* (2013.01)

(58) Field of Classification Search
USPC ........................................................... 705/4
See application file for complete search history.

(56) References Cited

U.S. PATENT DOCUMENTS

| | | | |
|---|---|---|---|
| 8,719,114 B2 | 5/2014 | Libman | |
| 2009/0216591 A1 | 8/2009 | Buerger et al. | |
| 2010/0217616 A1 | 8/2010 | Colson et al. | |
| 2010/0223078 A1* | 9/2010 | Willis | G06Q 40/08 705/4 |
| 2012/0239515 A1 | 9/2012 | Batra et al. | |
| 2012/0296748 A1 | 11/2012 | Libman | |
| 2013/0332204 A1* | 12/2013 | Fiori | G06Q 40/08 705/4 |
| 2014/0222469 A1* | 8/2014 | Stahl | G06Q 40/08 705/4 |

OTHER PUBLICATIONS

A case-based customer classification approach for direct marketing by Chaochang Chiu https://doi.org/10.1016/S0957-174(01)00052-5 (Year: 2002).*
Comparing methods to separate treatment from self-selection effects in an online banking setting by Sonja Gensler, Peter Leeflang, Bernd Skier https://doi.org/10.1016/j.jbusres.2012.02.025 (Year: 2012).*
Cluster analysis using data mining approach to develop CRM methodology to assess the customer loyalty by Seyed Mohammad Seyed Hosseini, Anahita Maleki, Mohammad Reza https://doi.org/10.1016/j.eswa.2009.12.070 (Year: 2009).*

* cited by examiner

*Primary Examiner* — Hani M Kazimi
*Assistant Examiner* — Hatem M Ali
(74) *Attorney, Agent, or Firm* — Howard IP Law Group, PC

(57) ABSTRACT

According to some embodiments, data associated with a plurality of potential insurance customers may be received and analyzed to identify a set of similar potential insurance customers. For the set of similar potential insurance customers, at least one customized insurance parameter may be automatically determined and a customized insurance product, including a customized insurance premium value, may be created based on the customized insurance parameter. It may then be arranged for each of the similar potential insurance customers to receive an indication of the customized insurance product.

13 Claims, 12 Drawing Sheets

180# SYSTEM FOR DYNAMICALLY CUSTOMIZING PRODUCT CONFIGURATIONS

BACKGROUND

In some cases, it can be hard to accurately provide appropriate insurance related information to a potential insurance customer. For example, a small business owner might be unsure of what types of insurance are appropriate and/or the amounts of coverage or deductibles are typical for similarly sized businesses, etc. As a result, it can be difficult for an insurance provider to suggest appropriate types of insurance policies, determine a recommended amount of insurance coverage and/or deductibles, and/or to predict likely insurance premium values for the potential customer. These difficulties can cause potential customers to miss opportunities to reduce risk and protect their enterprises. For example, an insurer might find it difficult to inform a retail florist about the appropriate types and amounts of insurance coverage similar businesses have purchased in the past. Further exacerbating these difficulties is the fact that some commercial insurance coverages are suited for use together, while others are incompatible with one another.

An insurer might manually investigate and compile information describing a business or other entity to be insured. This information may then be used recommend a set of insurance coverages based on an insurance agent's professional experience. Aggregating and reviewing this information may be a difficult task, and the lag time for generating a recommendation may make such an approach impractical, especially when there a substantial number of potential insurance customers. Moreover, the quality of the recommendation may be limited by the professional experience of the agent.

Systems and methods are desired to facilitate a customized recommendation of insurance coverages which are appropriate for a given entity. Also desired are prompt presentation of the recommendation, and/or determination of the recommendation based on significant quantities of historical data associated with other entities and insurance coverages.

SUMMARY OF THE INVENTION

According to some embodiments, systems, methods, apparatus, computer program code and means may be provided to efficiently and accurately facilitate the creation of a customized insurance product for a potential insurance customer. In some embodiments, data associated with a plurality of potential insurance customers may be received and analyzed to identify a set of similar potential insurance customers. For the set of similar potential insurance customers, at least one customized insurance parameter may be automatically determined and a customized insurance product, including a customized insurance premium value, may be created based on the customized insurance parameter. It may then be arranged for each of the similar potential insurance customers to receive an indication of the customized insurance product.

Some embodiments comprise: means for receiving, by a computer processor of a customization platform, data associated with a plurality of potential insurance customers; means for analyzing, by the computer processor, the data associated with the plurality of potential insurance customers to identify a set of similar potential insurance customers; for the set of similar potential insurance customers, means for automatically determining at least one customized insurance parameter; for each similar potential insurance customer, means for creating a customized insurance product, including a customized insurance premium value, based on the automatically determined customized insurance parameter; and means for arranging for each of the similar potential insurance customers to receive an indication of the customized insurance product.

A technical effect of some embodiments of the invention may be an improved and computerized method to facilitate the creation of a customized insurance product for a potential insurance customer. With these and other advantages and features that will become hereinafter apparent, a more complete understanding of the nature of the invention can be obtained by referring to the following detailed description and to the drawings appended hereto.

DETAILED DESCRIPTION

The present invention provides significant technical improvements to insurance product customization technology. The present invention is directed to more than merely a computer implementation of a routine or conventional activity previously known in the industry as it significantly advances the technical efficiency, access and/or accuracy of insurance product customization by implementing a specific new method and system as defined herein. The present invention is a specific advancement in the area of insurance product customization by providing technical benefits in data accuracy, data availability and data integrity and such advances are not merely a longstanding commercial practice. The present invention provides improvement beyond a mere generic computer implementation as it involves the processing and conversion of significant amounts of data in a new beneficial manner as well as the interaction of a variety of specialized insurance, client and/or vendor systems, networks and subsystems. For example, by utilizing the present invention, thousands of potential customers may be identified and appropriate insurance products may be customized for all of those customers in a relatively quick fashion by a specialized customization platform.

Figure 1:
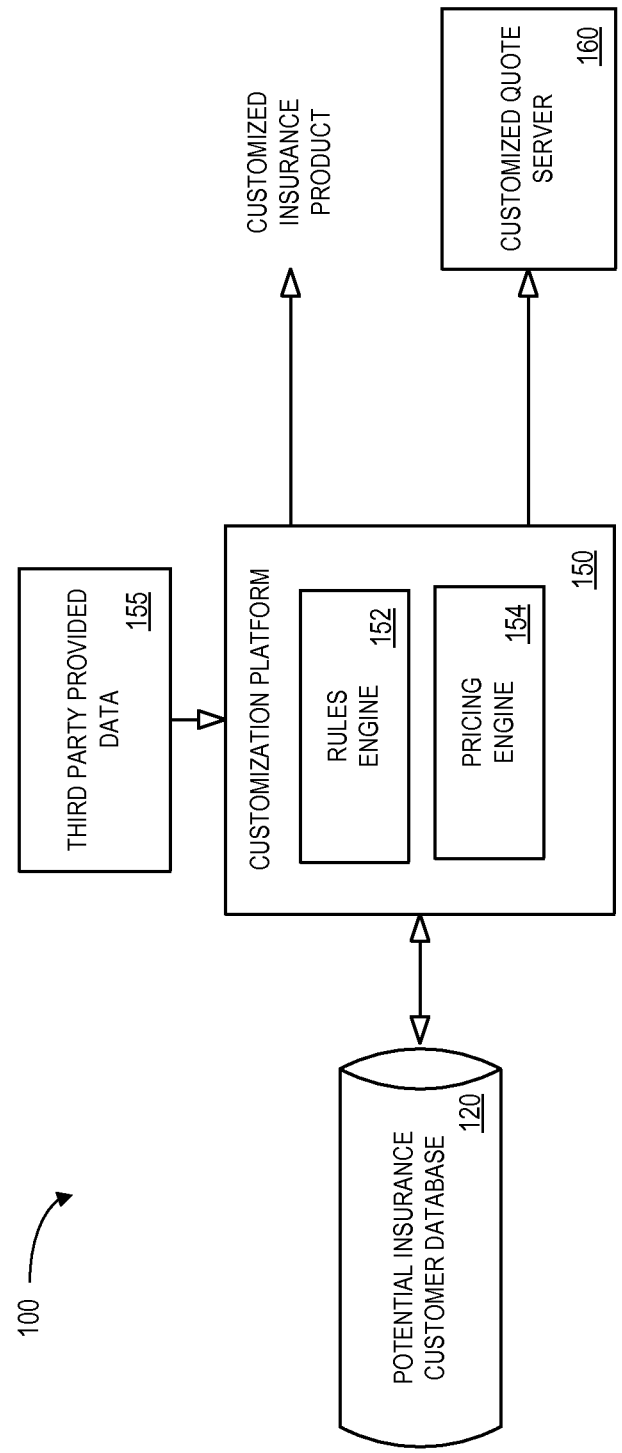
FIG. 1 is block diagram of a system according to some embodiments of the present invention.

FIG. 1 is block diagram of a system 100 according to some embodiments of the present invention. In particular, a customization platform 150 associated with an insurance provider may receive information about a potential insurance customer. The information about the potential insurance customer might be received, for example, from a potential insurance customer database 120 and/or comprise third-party provided data 155 (e.g., from a telephone directory service or a Department of Motor Vehicles server). Note that information from multiple sources might be matched and combined into a single electronic record representing a potential insurance customer. The customization platform 150 may use a rules engine 152 and/or a pricing engine 154 to automatically generate information about an appropriately customized insurance product (e.g., a proposed sample insurance policy) for the potential insurance customer in accordance with any of the embodiments described herein. The information about the customized insurance product might be provided via, for example, a postal mailing, a customized quote server 160, Personal Computers (PCs), laptop computers, and/or wireless telephones that can receive insurance data from the customization platform 150 and/or customized quote server 160.

According to some embodiments, the automated customization platform 150 generates the customized insurance product, such as an indication of a recommended level of insurance coverage and associated insurance premium for the customer. As used herein, the term automated may refer to, for example, actions that can be performed with little or no human intervention. By way of example only, the customization platform 150 may be associated and/or communicate with a PC, an enterprise server, and/or a database farm. According to some embodiments, the customization platform 150 is associated with an insurance provider or a number of different insurance providers. Moreover, according to some embodiments, a model (e.g., a multi-dimensional and/or weighted model) at the platform 150 may facilitate the generation of a customized insurance product.

As used herein, devices, including those associated with the customization platform 150, and any other device described herein, may exchange information via any communication network (not illustrated in FIG. 1) which may be one or more of a Local Area Network (LAN), a Metropolitan Area Network (MAN), a Wide Area Network (WAN), a proprietary network, a Public Switched Telephone Network (PSTN), a Wireless Application Protocol (WAP) network, a Bluetooth network, a wireless LAN network, and/or an Internet Protocol (IP) network such as the Internet, an intranet, or an extranet. Note that any devices described herein may communicate via one or more such communication networks.

Note that the customization platform 150 may be associated with various types of insurance policies, including those related to personal insurance, business insurance, workers' compensation insurance, liability insurance, automobile insurance, health insurance, disability insurance, and wealth management offerings, including property and casualty insurance, life insurance, retirement and education investment products, and group benefits offerings.

Although a single customization platform 150 is shown in FIG. 1, any number of such devices may be included in the system 100. Moreover, various devices described herein might be combined according to embodiments of the present invention. For example, in some embodiments, the customization platform 150 and the potential insurance customer database 120 might be co-located and/or may comprise a single apparatus. Moreover, according to some embodiments, internal data and/or the third-party provided data 155 (e.g., Dunn and Bradstreet data or similar information) may be used to supplement the information.

Figure 2:
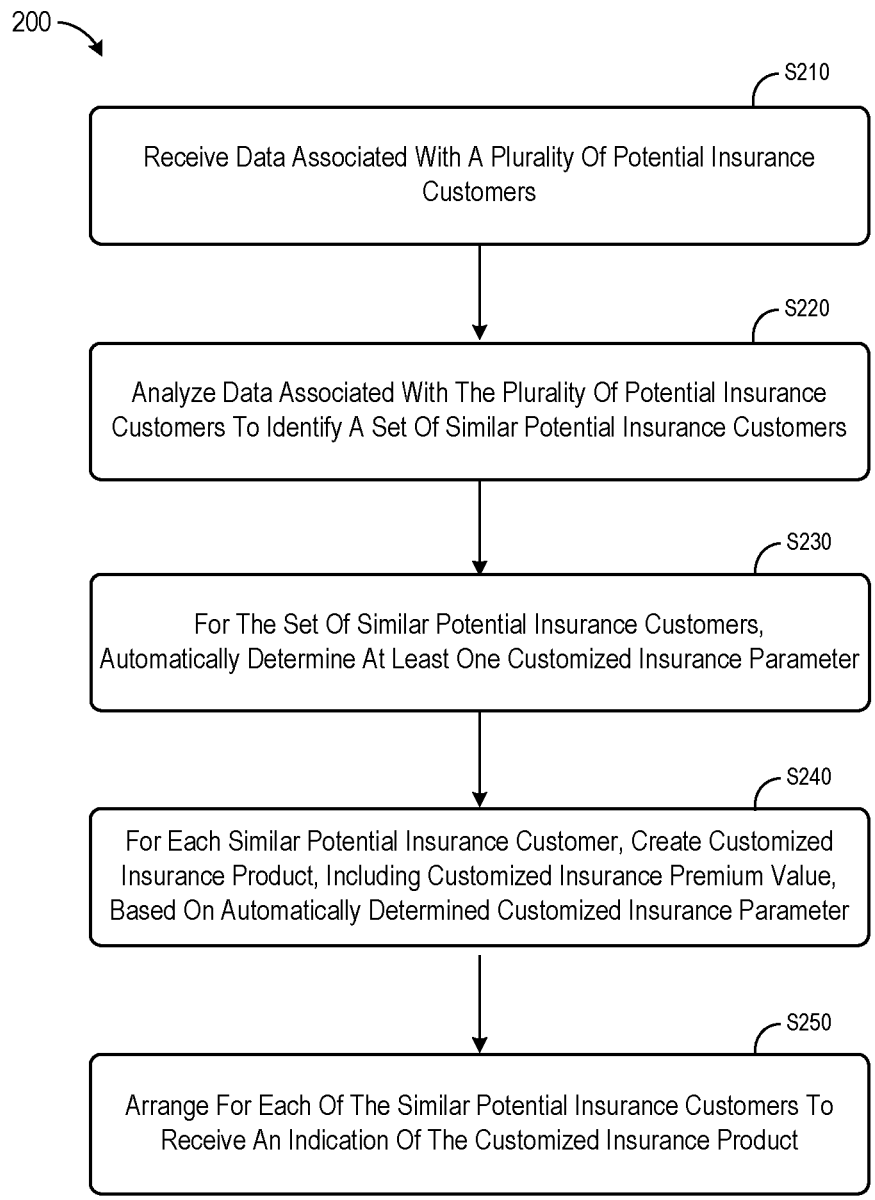
FIG. 2 illustrates a process in accordance with some embodiments of the present invention.

FIG. 2 illustrates a process 200 that might be performed, for example, by some or all of the elements of the system 100 described with respect to FIG. 1 according to some embodiments. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

The process 200 may be performed to facilitate a determination of customized insurance product information for a potential insurance customer. Pursuant to some embodiments, at S210 data associated with a plurality of potential insurance customers may be received. The received data may include any data associated with entities for which insurance coverage customizations are desired. The data may be received from third party sources (e.g., public records, Secretary of State databases), from proprietary data sources, internal sources and from any other suitable data sources.

The received data may include, but is not limited to, types of insurance coverages in which entities may be interested (e.g., property, general liability, workers' compensation), entity type, address, ZIP code, annual revenue, number of employees, and SIC code. Some examples of current entity data which may be received from proprietary data sources include derived insurance company metrics such as issue rate per SIC codes, Catastrophic/Terrorism threat based on location, appetite (Target, Acceptable, Limited, Not Acceptable) based on SIC code and state, and business insurance scores indicating the desirability of the entity as an insurance customer. The data received at S210 may change depending upon the insurance coverage types of interest. For example, annual revenue data might be received if liability coverage is being evaluated, and/or a number of employees might be received if workers' compensation coverage is of interest. Other examples of data associated with the plurality of potential insurance customers include social media site information, an email address, a business name, information associated with an accounting application, and/or information associated with a human resources application. Note that the potential insurance customers may include, according to some embodiments, actual insurance customers (e.g., customers who previously purchased a different type of insurance from the insurer).

At S220, the data associated with the plurality of potential insurance customers may be analyzed to identify a set of "similar" potential insurance customers. That is, the data may be used to identify clusters or segments of potential customers that may share similar risk or other insurance related characteristics. According to some embodiments, third-party data may also be used to analyze the data associated with the plurality of potential insurance customers. By way of examples only, the analyzed data might include a business type, a corresponding SIC code or codes, a number of locations, addresses, a number of employees, and/or annual revenue.

The information about potential customers may be analyzed in connection with clusters or segments according to any clustering system that is or becomes known. In some embodiments, the data may be clustered by a combination of the Balanced Iterative Reducing and Clustering using Hierarchies ("BIRCH") algorithm (e.g., for metric values) and the Bi-Level Clustering of Mixed ("BILCOM") categorical and numerical data types algorithm (e.g., for metric and categorical values). Note that the customization platform may not need to have a complete set of information about some or all of the potential insurance customers. For example, information about one or more potential customers might be inferred from the cluster that customer is associated with (e.g., the customer's ZIP code or industry code might be inferred).

Figure 3:
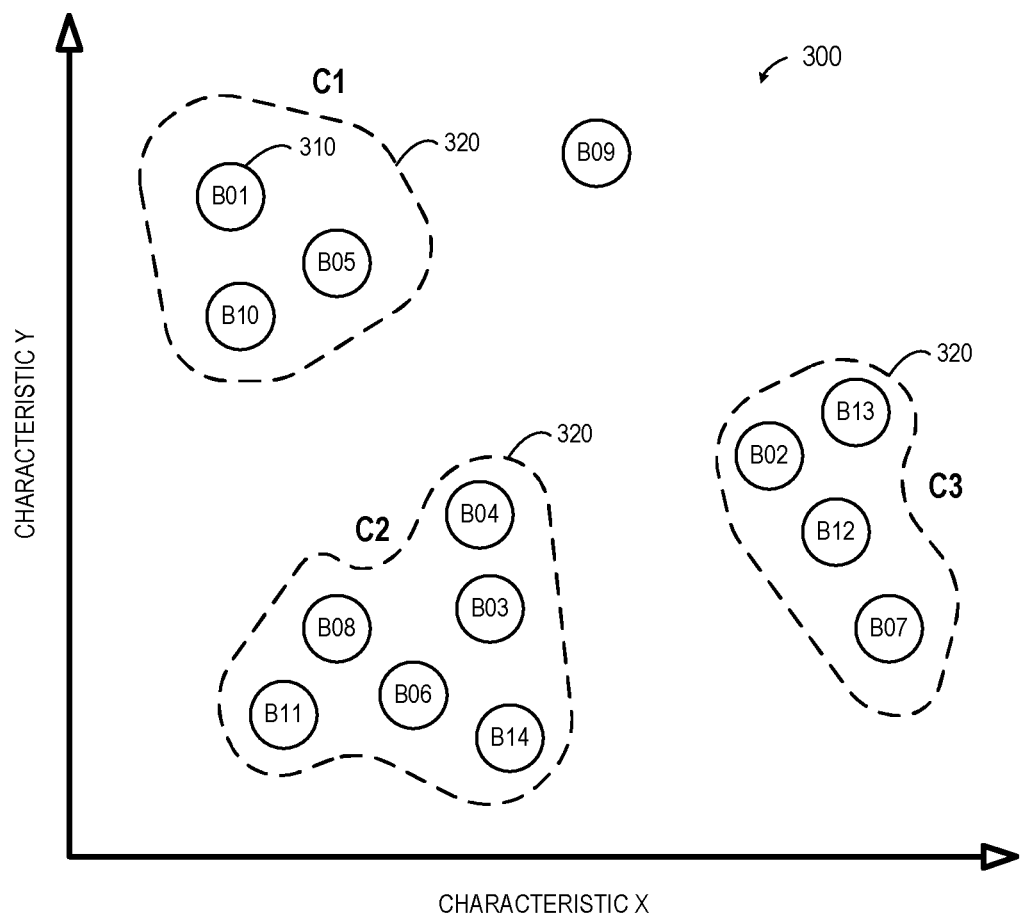
FIG. 3 is a simplified representation of segments or clusters of potential customer data records according to some embodiments.
Figure 7:
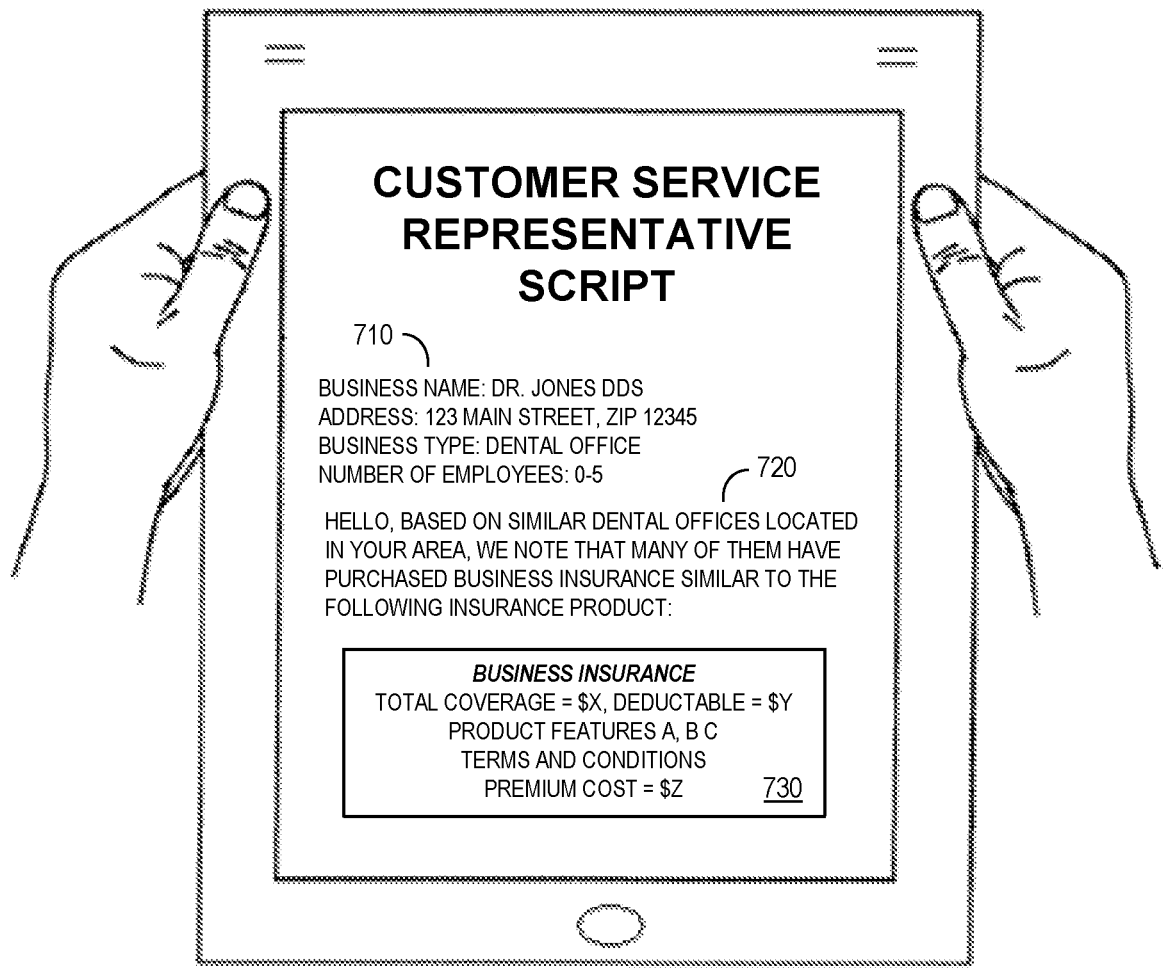
FIG. 7 illustrates a handheld or tablet device displaying a customer service representative script in accordance with some embodiments.

FIG. 3 is a simplified representation 300 of clusters 320 (C1 through C3) of entity data records 310 (representing businesses B01 through B14) according to some embodiments. Specifically, the entity data records are clustered across many dimensions (e.g., one dimension per data field) but FIG. 7 shows only two dimensions, associated with characteristic X and characteristic Y, for clarity although embodiments may be associated with any number of dimensions (e.g., including tens or even hundreds of dimensions). Each cluster 320 (represented by a dashed line) may be represented, for example, by a weighted midpoint across all dimensions (e.g., data fields). As illustrated in FIG. 3, cluster C1 includes businesses B01, B05, and B10. Although each entity is shown in FIG. 3 as belonging to at most one cluster 320, embodiments may provide for overlapping clusters 320.

An entity may be matched to one of the clusters 320 using any suitable matching algorithm. According to some examples, an acceptable "similarity" distance between certain metric values of the records may be specified (e.g., if an entity data record contains "number of years in business" equals "20", match clusters where number of years is within 5 of that value (i.e., from 15 years to 25 years) may be matched. According to some embodiments, an ordering of categorical values may also be specified. For example, an SIC code of 1731 (electrical work) might be closer to 1799 (special trade contractors) than it is to 1741 (masonry and other stonework). Moreover, the matching algorithm may specify acceptable thresholds for appetite (e.g., T & A, but not L & N) and Catastrophic/Terrorism threat levels. As another example, information associated with a dry cleaning business might identify related businesses, such as other dry cleaners or other companies that use potentially harmful chemicals. This set of related businesses may further be identified based at least in part on information from a third party data store. The information from the third party data store might include, for example, coverage and policy transaction data and loss data from an information aggregator. Moreover, according to some embodiments, the set of related businesses may be further identified based at least in part on information from an internal data store (e.g., internal to the insurance provider).

Note that different clusters 320 may be associated with different insurance parameters. For example, cluster C1 might be associated with a first business insurance coverage amount while cluster C2 is associated with a higher amount. According to some embodiments, different clusters 320 may be associated with different types of insurance and/or different insurance coverage packages (where each of the determined insurance coverage packages may include one or more insurance coverages). Referring again to FIG. 2, at S230 at least one customized insurance parameter may be automatically determined for the set of similar customers (e.g., based on an identified cluster or segment). For example, it might be determined that each similar potential insurance customer typically purchases business insurance having $500,000 coverage and a $10,000 deductible amount.

At S240, a customized insurance product, including a customized insurance premium value, may be created for each similar potential insurance customer based on the automatically determined customized insurance parameter. The customized insurance product may represent, for example, a sample insurance policy generated based on risk characteristics, a recommended type of insurance coverage, premium information, historic losses, average claim values, and/or a claim frequency value.

According to some embodiments, the customization of an insurance product may be associated with one or more predictive models to take into account a large number of customer and/or underwriting parameters. The predictive model(s), in various implementations, may include one or more of neural networks, Bayesian networks (such as Hidden Markov models), expert systems, decision trees, collections of decision trees, support vector machines, or other systems known in the art for addressing problems with large numbers of variables. Preferably, the predictive model(s) are trained on prior data and outcomes known to an insurance company. The specific data and outcomes analyzed vary depending on the desired functionality of the particular predictive model. The particular data parameters selected for analysis in the training process may be determined by using regression analysis and/or other statistical techniques known in the art for identifying relevant variables in multivariable systems. The parameters can be selected from any of the structured data parameters stored in the present system, whether the parameters were input into the system originally in a structured format or whether they were extracted from previously unstructured text, such as from a text based social media network or any other data. By way of example, a predicted number of employees or range of probable sales values may be used in connection with an estimated amount of risk or exposure.

In the present invention, the selection of weighting factors may improve the predictive power of the coverage comparison engine, as well as to increase the perceived or actual fairness of received inputs or customized insurance product. For example, an entity having established and highly frequented social networking sites may be associated with a lower risk factor, while newer, less established sites would be associated with a relatively higher risk. As another example, information about a potential insurance customer might include a ZIP code, a business name, a postal address, and/or a business classification code. In this case, a number of employees associated with the potential insurance customer might be estimated based on the geographic information and other entities within that geographic cluster. For example, an insurance model might determine that a vast majority of businesses in a particular ZIP code have less than twenty employees. As a result, it may be inferred that the potential insurance customer in that ZIP code will also have less than twenty employees. Note that instead of a number of employees, embodiments may instead infer a total payroll value (and/or job titles or benefits associated with employees), a property value, a type of industry, or any other useful information. Moreover, note that information from multiple third party and/or other data sources might be combined in accordance with any of the embodiments described herein.

Figure 4:
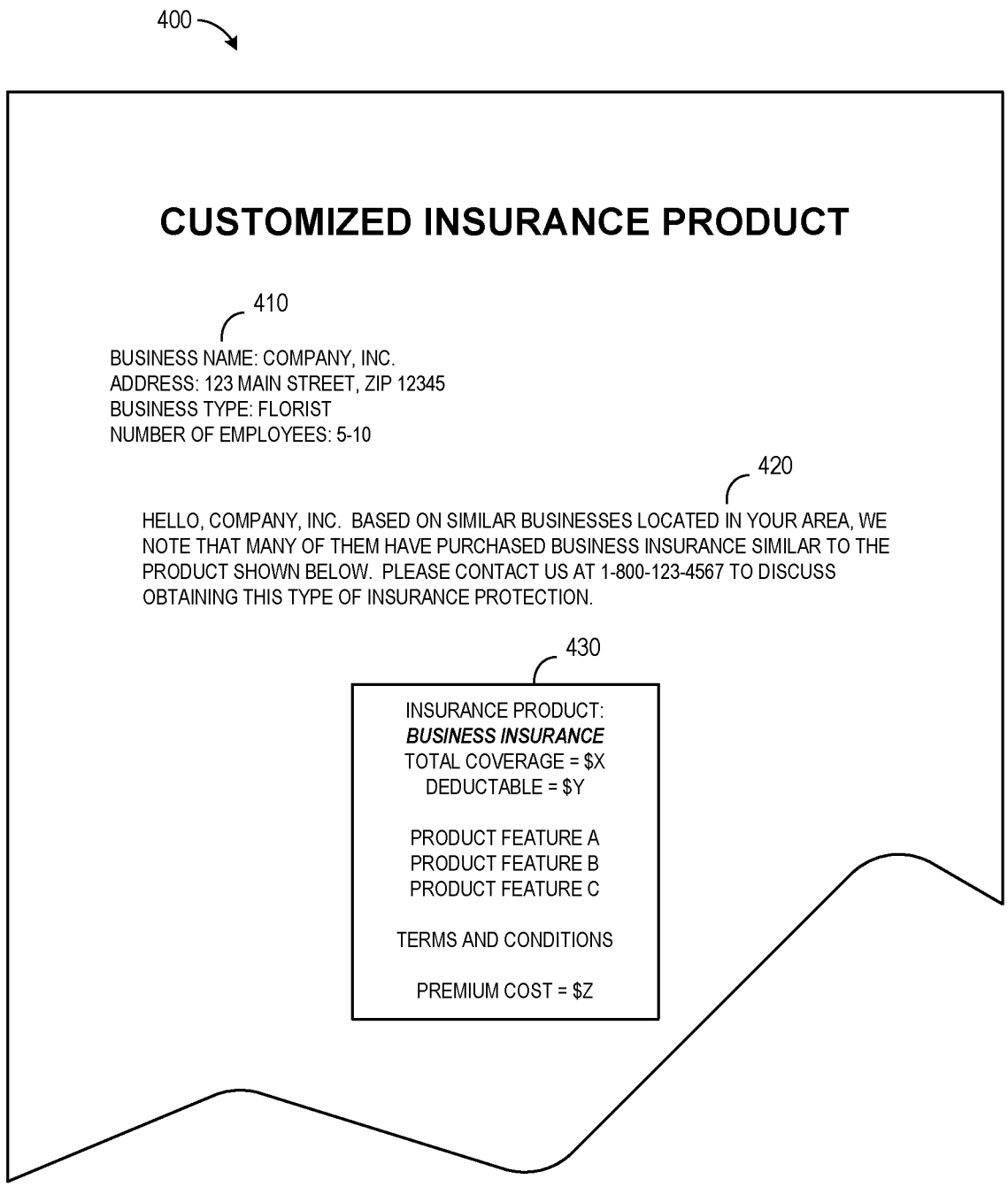
FIG. 4 is an example of a paper postal mailing that might be sent to a potential insurance customer according to some embodiments.

At S250, it may be arranged for each of the similar potential insurance customers to receive an indication of the customized insurance product. For example, this arranging might be associated with an automatic creation and mailing of the customized insurance product (e.g., by printing an advertisement showing a sample insurance policy and premium that might be appropriate for the entity). FIG. 4 is an example of a paper postal mailing 400 that might be sent to a potential insurance customer according to some embodiments. The mailing 400 might include, for example, information identifying the potential customer 410, information instructing the potential customer as to the purpose of the mailing 420, and, finally, a description of the customized insurance product 430 (e.g., including coverage and deductible amounts, premium values, terms and condition, etc.).

Figure 5:
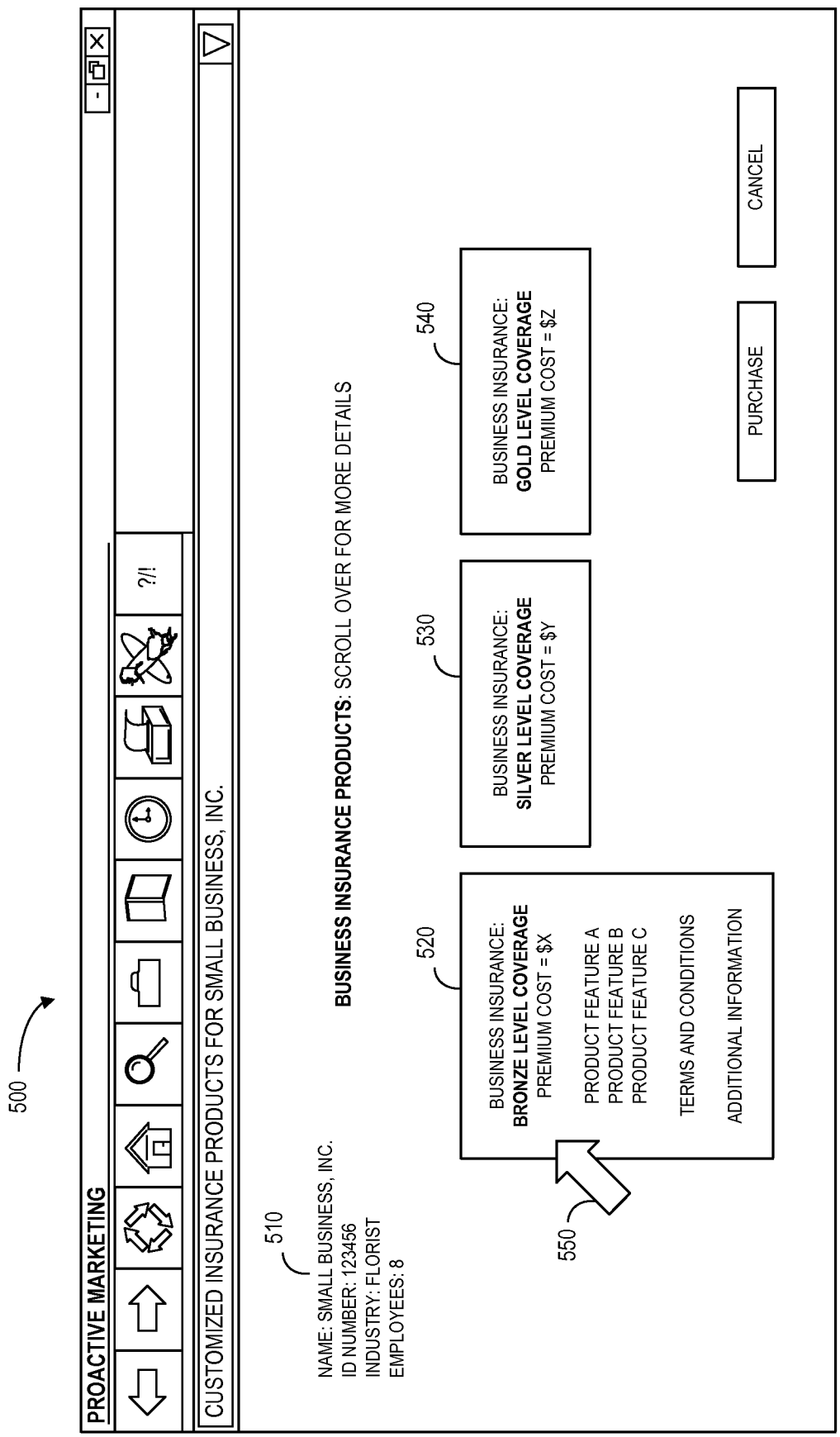
FIG. 5 illustrates a web page that might be displayed to a potential insurance customer according to some embodiments.

According to other embodiments, arranging for each of the similar potential insurance customers to receive an indication of the customized insurance product is associated with an automatic creation and transmission of an email of the customized insurance product or an automatic pre-population of at least a portion of a web page. For example, FIG. 5 illustrates a web page 500 that might be displayed to a potential insurance customer according to some embodiments. The web page 500 might include, for example, information identifying the potential customer 510 (including pre-populated fields) and descriptions of a number of different customized insurance products 520, 530, 540 (e.g., including coverage and deductible amounts, premium values, terms and condition, etc.). According to this embodiment, the potential customer may see detailed information about each customized product 520, 530, 540 using his or her computer mouse icon 550.

Figure 6:
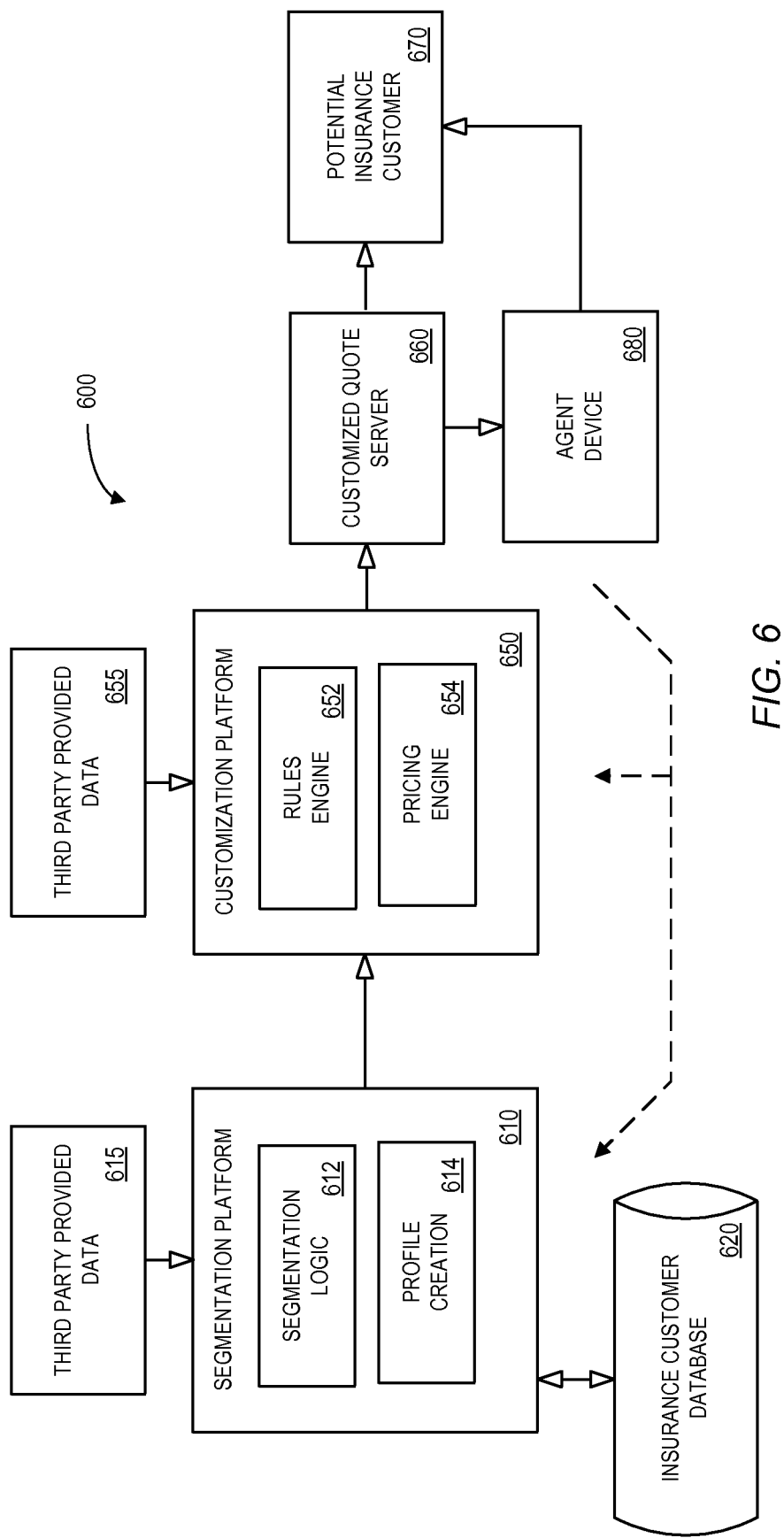
FIG. 6 is block diagram of a system according to some embodiments of the present invention.

In this way, similar potential customers may receive appropriately customized insurance product. FIG. 6 is block diagram of a system 600 to facilitate this process according to some embodiments of the present invention. As before, a customization platform 650 associated with an insurance provider may receive information about a potential insurance customer. The information about the potential insurance customer might be received, for example, from a potential insurance customer database and/or comprise third-party provided data 655 (e.g., from a telephone directory service or a Department of Motor Vehicles server). Note that information from multiple sources might be matched and combined into a single electronic record representing a potential insurance customer. The customization platform 650 may use a rules engine 652 and/or a pricing engine 654 to automatically generate information about an appropriately customized insurance product (e.g., a proposed sample insurance policy) for the potential insurance customer in accordance with any of the embodiments described herein.

According to this embodiment, the rules engine may identify similar entities (e.g., clusters or segments) based on information received from a segmentation platform 610. The segmentation platform 610 may, for example, have segmentation logic 612 and/or utilize entity profile creations 614 to facilitate the process. That is, the segmentation platform 610 may create segmentation logic 612 using profile parameters for use in the identification of the set of similar potential insurance customers. According to some embodiments, third-party provided data 615 may also be used to create the segmentation logic 612.

The information about the customized insurance product might be provided to a potential insurance customer 670 via, for example, a customized quote server 660 and/or an agent device 680. According to some embodiments, the automated customization platform 650 generates the customized insurance product, such as an indication of a recommended level of insurance coverage and associated insurance premium for the customer. Note that the customization platform 650 may be associated with various types of insurance policies, including those related to personal insurance, business insurance, workers' compensation insurance, liability insurance, etc. According to some embodiments, results associated with the customized insurance products (e.g., whether or not the potential insurance customer 670 actually contacted the insurer and/or purchased an insurance policy) may be fed back and used to tune or otherwise adjust determinations of subsequent customized insurance parameters and segments (e.g., by decreasing the value of a deductible amount displayed to potential customers). For example, the results might be cycled back within the system and used to train predictive models associated with clustering, profiling, pricing, or any other of the information and decisions described herein.

Instead of providing information directly to the potential insurance customer 670, according to some embodiments the customization platform 650 may automatically pre-populate of at least a portion of a Customer Service Representative ("CSR") script that may be used to guide interactions between an insurance agent device 680 (e.g., telephone) and the potential insurance customer. FIG. 7 illustrates a handheld or tablet device displaying a CSR script 700 in accordance with some embodiments. The script 700 might include, for example, information identifying the potential customer 710, information instructing the potential customer as to the purpose of the telephone call 720, and, finally, a description of the customized insurance product 730 (e.g., including coverage and deductible amounts, premium values, terms and condition, etc.).

Figure 8:
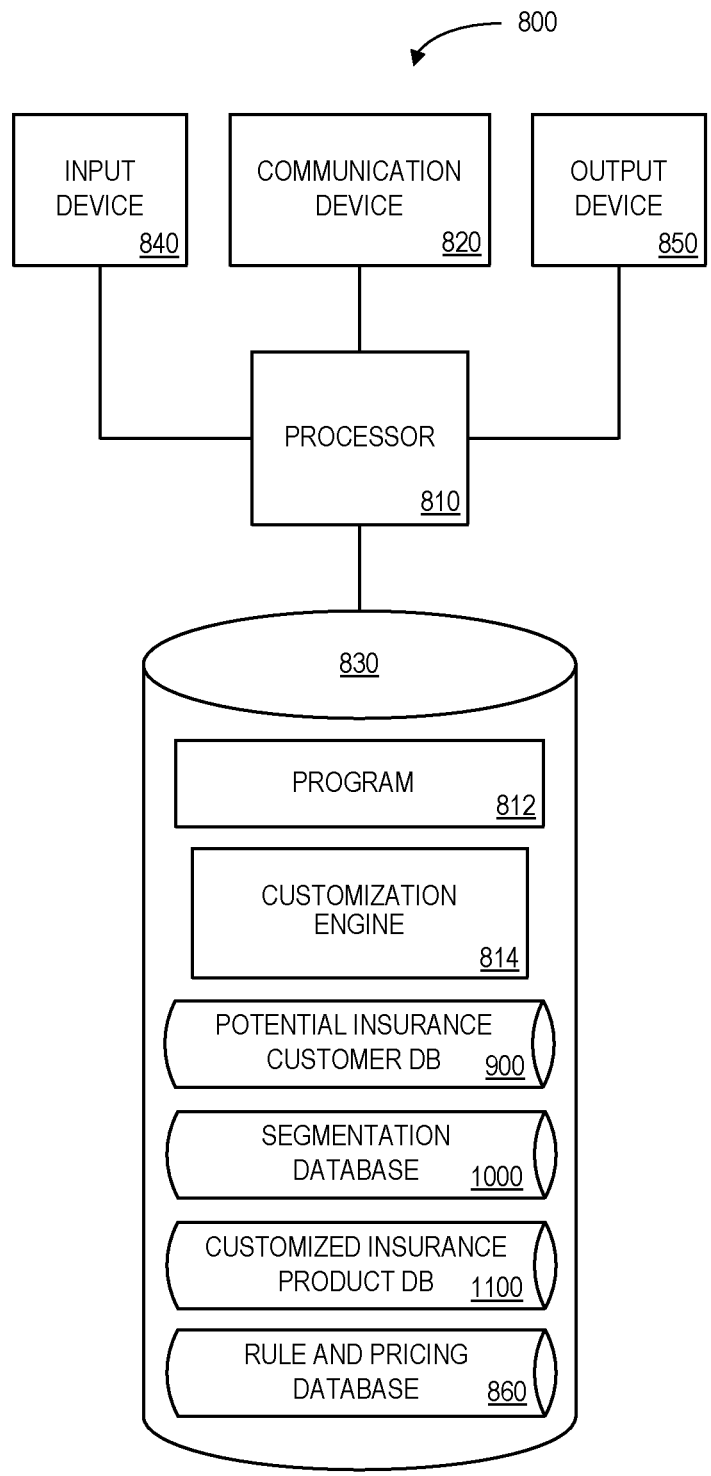
FIG. 8 is an example of a customization platform according to some embodiments.

As a result of the embodiments described herein, an improved system and method to facilitate a customization of insurance information for a potential insurance customer may be achieved. Note that embodiments described herein may be implemented in any number of different ways. For example, FIG. 8 is a block diagram overview of a customization platform 800 according to some embodiments. The customization platform 800 may be, for example, associated with the system 100 of FIG. 1 or the system 600 of FIG. 6. The customization platform 800 comprises a processor 810, such as one or more commercially available Central Processing Units (CPUs) in the form of one-chip microprocessors, coupled to a communication device or interface 820 configured to communicate via a communication network (not shown in FIG. 8). The communication device 820 may be used to communicate, for example, with one or more remote customer or agent devices. The customization platform 800 further includes an input device 840 (e.g., a mouse and/or keyboard to enter rule and/or model adjustments) and an output device 850 (e.g., a computer monitor to display reports and/or aggregated results to an administrator).

The processor 810 also communicates with a storage device 830. The storage device 830 may comprise any appropriate information storage device, including combinations of magnetic storage devices (e.g., a hard disk drive), optical storage devices, mobile telephones, vehicle computers, and/or semiconductor memory devices. The storage device 830 stores a program 812 and/or a customization engine 814 for controlling the processor 810. The processor 810 performs instructions of the programs 812, 814, and thereby operates in accordance with any of the embodiments described herein. For example, the processor 810 may receive data associated with a plurality of potential insurance customers and analyze the data to identify a set of similar potential insurance customers. For the set of similar potential insurance customers, at least one customized insurance parameter may be automatically determined by the processor 810 and a customized insurance product, including a customized insurance premium value may be created based on the customized insurance parameter. It may then be arranged by the processor 810 for each of the similar potential insurance customers to receive an indication of the customized insurance product.

The programs 812, 814 may be stored in a compressed, uncompiled and/or encrypted format. The programs 812, 814 may furthermore include other program elements, such as an operating system, a database management system, and/or device drivers used by the processor 810 to interface with peripheral devices.

As used herein, information may be "received" by or "transmitted" to, for example: (i) the customization platform 800 from another device; or (ii) a software application or module within the customization platform 800 from another software application, module, or any other source.

In some embodiments (such as shown in FIG. 8), the storage device 830 stores a potential insurance customer database 900, segmentation database 1000, a customized insurance product database 1100, and a rule and pricing database 860. Examples of a database that may be used in connection with the customization platform 800 will now be described in detail with respect to FIGS. 9 through 11. Note that the databases described herein are only examples, and additional and/or different information may be stored therein. Moreover, various databases might be split or combined in accordance with any of the embodiments described herein.

Figure 9:
FIG. 9 is a tabular representation of a portion of a potential insurance customer database according to some embodiments.

Referring to FIG. 9, a table is shown that represents the potential insurance customer database 900 that may be stored at the customization platform 800 according to some embodiments. The table may include, for example, entries identifying potential insurance customers. The table may also define fields 902, 904, 906, 908, 910 for each of the entries. The fields 902, 904, 906, 908, 910 may, according to some embodiments, specify: a customer identifier 902, a ZIP code 904, an insurance category 906, a number of employees 908, and cluster 910. The information in the potential insurance customer database 900 may be created and updated, for example, based on third party provided data and/or other information sources.

The customer identifier 902 may be, for example, a unique alphanumeric code identifying a potential small business customer. The ZIP code 904 may indicate where that potential customer has business locations. The insurance category 906 may be associated with the type or work performed by the business, and the number of employees 908 may indicate how many people work for the business. The cluster 910 might indicate one or more clusters or market segments are associated with the customer (e.g., with businesses B01 and B05 being "similar" in FIG. 9 because bother are in cluster C1).

Figure 10:
FIG. 10 is a tabular representation of a portion of a segmentation database according to some embodiments.

Referring to FIG. 10, a table is shown that represents the segmentation database 1000 that may be stored at the customization platform 800 according to some embodiments. The table may include, for example, entries identifying segments of similar potential customers. The table may also define fields 1002, 1004, 1006, 1008 for each of the entries. The fields 1002, 1004, 1006, 1008 may, according to some embodiments, specify: a cluster identifier 1002, a description 1004, one or more insurance parameters 1006, and a list of entities 1008. The information in the segmentation database 1000 may be created and updated, for example, a segmentation platform using historical insurance data and/or third party provided data.

The cluster identifier 1002 may be, for example, a unique alphanumeric code identifying a cluster of similar businesses and may be based on or associated with the cluster 910 of FIG. 9. The description 1004 may describe the segment and/or provide rules used to identify or define the businesses within that market segment. The insurance parameters 1006 may indicate appropriate types of insurance products, coverage and deductible values, terms and conditions, etc. that may be appropriate for businesses within that market segment or cluster. The entities 1008 may list the businesses 1008 that have been identified as being within the cluster (e.g., with cluster C1 including businesses B01, B05, and B10).

Figure 11:
FIG. 11 is a tabular representation of a portion of a customized insurance product database according to some embodiments.

Referring to FIG. 11, a table is shown that represents the customized insurance product database 1100 that may be stored at the customization platform 800 according to some embodiments. The table may include, for example, entries identifying potential insurance customers. The table may also define fields 1102, 1104, 1106, 1108 for each of the entries. The fields 1102, 1104, 1106, 1108 may, according to some embodiments, specify: a product identifier 1102, a customer identifier 1104, an insurance category and details 1106, and a result 1108. The information in the customized insurance product database 1100 may be created and updated, for example, as a customization platform generates data for potential insurance customers.

The product identifier 1102 may be, for example, a unique alphanumeric code identifying a "customized insurance product" that has been created. As used herein, the term "customized insurance product" may refer to, for example, a sample or exemplary illustration of an insurance product (that is, the potential customer may still need to contact an insurance agent and confirm details before an actual insurance policy is sold). The customer identifier 1104 may represent a potential customer for which the customized insurance product was generated. The insurance category and details 1106 may indicate the type of insurance, premium values, coverage and deductible amounts, terms and conditions, etc., that were generated for that particular customer based on data associated with other, similar customers. The result 1108 might indicate, for example, if the customer requested an insurance quote or purchased an insurance policy (and may, according to some embodiments, be used to tune or adjust other elements of the system to improve performance).

Thus, embodiments described herein may facilitate the efficient and accurate customization of insurance products for potential insurance customers. Moreover, the efficiency and success of the system's performance (e.g., the results of the offers provided to small businesses) may be monitored on a substantially real time basis and used to train the system for future sales campaigns.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Figure 12:
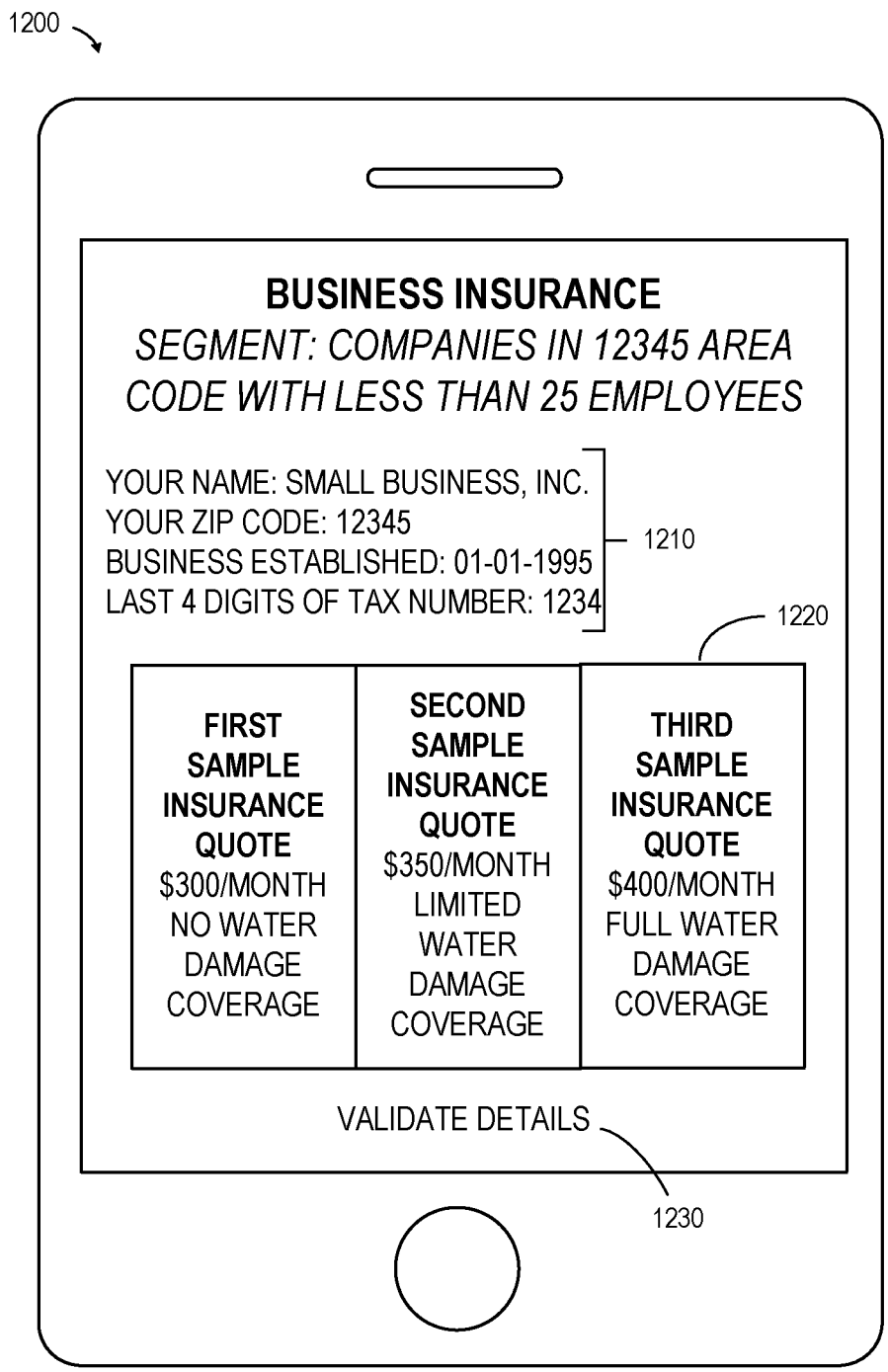
FIG. 12 illustrates a mobile device displaying customized insurance information in accordance with some embodiments.

Although specific hardware and data configurations have been described herein, note that any number of other configurations may be provided in accordance with embodiments of the present invention (e.g., some of the information associated with the databases described herein may be combined or stored in external systems). Additionally, one or more of the elements described herein may be practiced in a distributed cloud computing environment where tasks are performed by logically or physically remote processing devices that are linked through one or more communications networks. For example, FIG. 12 illustrates a mobile device 1200 displaying customized insurance information in accordance with some embodiments. The display might include, for example, information identifying the potential customer 1210, information describing several different customized insurance product options 1220 (e.g., including coverage and deductible amounts, premium values, terms and condition, etc.), and an option 1230 for the potential customer to "validate the details" and potentially receive a binding insurance quote.

Applicants have discovered that embodiments described herein may be particularly useful in connection with insurance products. Note, however, that other types of insurance and related products may also benefit from the invention. For example, embodiments of the present invention may be used to customize data for financial, medical, educational, and other types of products.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed:

1. A system, comprising:
    a data storage device for storing data associated with a plurality of potential customers;
    a segmentation computer platform comprising a processor and including segmentation logic for identifying clusters of similar potential customers who share similar risk characteristics based upon one of a Balanced Iterative Reducing and Clustering using Hierarchies ("BIRCH") algorithm and a Bi-Level Clustering of Mixed ("BILCOM") categorical and numerical data types algorithm to at least ten parameters concerning the similar potential customers;
    a customization computer platform comprising a processor and including a rules engine and a pricing engine coupled to the segmentation computer platform and a computerized predictive model trained on outcomes and multi-variate prior customer data selected based upon regression analysis including at least eight variables to create customized products for potential customers, said computerized predictive model comprising one or more of a neural network, a Bayesian network, expert systems, decision trees, collections of decision trees, support vector machines, and a large number of variables model, said customization computer platform configured to:
        receive, via a communication device from a third party computing devices, third party data corresponding to one or more of the plurality of potential customers including social media site data relating to the one or more of the plurality of potential customers;
        analyze the data associated with the plurality of potential customers and the third party data using the segmentation logic from the segmentation computer platform to:
            identify one or more clusters of similar potential customers, wherein said analyzing using the segmentation logic comprises comparing the at least ten parameters of the third party data associated with each of the plurality of potential customers, and
            matching each of the plurality of potential customers to one of the one or more clusters based upon application of a matching algorithm which identifies matches based upon distance between metric values of the at least ten parameters associated with each of the plurality of potential customers;
        automatically determine, for the each of the one or more clusters of similar potential customers, at least one customized quotation parameter that is common to each customized product created for each similar potential customer of the cluster of similar potential customers,
        for each similar potential customer, create a customized product, including a customized premium value, based on application of the computerized predictive model to at least the automatically determined customized quotation parameter, and to a weighted social network usage parameter and a weighted geographic location parameter determined by the computerized predictive model,
    a customized quotation server configured to, for each of the similar potential customers:
        generate a customer service script for facilitating interactions with the each of the similar potential customers, the customer service script including data indicative of the customized product for the similar potential customer;
        prepopulate data fields of the customer service script with at least some of the data associated with the similar potential customer;
        render, for display on a computing device of each of the similar potential customers, a web page including the data indicative of the customized product, and
        transmit the customer service script to an agent device associated with the similar potential customer.

2. The system of claim 1, wherein the segmentation computer platform uses third-party data to create the segmentation logic.

3. The system of claim 1, wherein results associated with the customized products are fed back and used to tune determinations of subsequent customized parameters.

4. The system of claim 1, wherein the data associated with a plurality of potential customers includes at least two of: (i) the social media site information, (ii) an email address, (iii) a ZIP code, (iv) a business name, (v) postal address information, (vi) a business classification code, (vii) information associated with an accounting application, (viii) information associated with a human resources application, (ix) a number of employees, and (x) a type of insurance.

5. The system of claim 1, wherein the customized product is created based on at least two of: (i) risk characteristics, (ii) a recommended type of insurance coverage, (iii) premium information, (iv) historic losses, (v) average claim values, and (vi) a claim frequency value.

6. A computer-implemented method, comprising:
receiving, by a customization platform comprising a processor, data associated with a plurality of potential customers;
receiving, via a communication device from a third party computing device, third party data corresponding to one or more of the plurality of potential customers including social media site data relating to the one or more of the plurality of potential customers;
analyzing, by the customization platform using segmentation logic from a segmentation computer platform comprising a processor, the data associated with the plurality of potential customers and the third party data, to:
identify one or more clusters of similar potential customers, wherein said analyzing using the segmentation logic comprises comparing multi-dimensional parameters, including at least ten parameters, of the third party data associated with each of the plurality of potential customers, and
matching each of the plurality of potential customers to one of the one or more clusters based upon application of a matching algorithm which identifies matches based upon distance between metric values of the at least ten parameters associated with each of the plurality of potential customers;
wherein the segmentation computer platform includes segmentation logic for identifying clusters of similar potential customers who share similar risk characteristics based upon one of a Balanced Iterative Reducing and Clustering using Hierarchies ("BIRCH") algorithm and a Bi-Level Clustering of Mixed ("BILCOM") categorical and numerical data types algorithm to the at least ten parameters concerning the similar potential customers;
automatically determining, by the customization platform for the each of the one or more clusters of similar potential customers, at least one customized quotation parameter that is common to each customized product created for each similar potential customer of the cluster of similar potential customers,
for each similar potential customer, creating, by the customization platform, a customized product, including a customized premium value, based on application of a computerized predictive model to the automatically determined customized quotation parameter, and to a weighted social network usage parameter and a weighted geographic location parameter determined by the computerized predictive model, wherein the computerized predictive model is trained on outcomes and multi-variate prior customer data including at least eight variables selected based upon regression analysis to create customized products for potential customers, said computerized predictive model comprising one or more of a neural network, a Bayesian network, expert systems, decision trees, collections of decision trees, support vector machines, and a large number of variables model,
generating, for each of the similar potential customers by a customized quotation server, a customer service script for facilitating interactions with the each of the similar potential customers, the customer service script including data indicative of the customized product for the similar potential customer;
prepopulating, by the customized quotation server, data fields of the customer service script with at least some of the data associated with the similar potential customer;
rendering, by the customized quotation server, for display on a computing device of each of the similar potential customers, a web page including the data indicative of the customized product, and
transmitting the customer service script to an agent device associated with the similar potential customer.

7. The method of claim 6, wherein the segmentation logic is created using profile parameters.

8. The method of claim 6, wherein results associated with the customized products are used to tune determinations of subsequent customized parameters.

9. The method of claim 6, wherein the data associated with a plurality of potential customers includes at least: (i) the social media site data, (ii) an email address, (iii) a ZIP code, (iv) a business name, (v) postal address information, (vi) a business classification code, (vii) information associated with an accounting application, (viii) information associated with a human resources application, (ix) a number of employees, and (x) a type of insurance.

10. The method of claim 6, wherein the customized product is created based on: (i) risk characteristics, (ii) a recommended type of insurance coverage, (iii) premium information, (iv) historic losses, (v) average claim values, and (vi) a claim frequency value.

11. A system for generating customized quotes, comprising:
a data storage device for storing data associated with a plurality of potential customers;
a segmentation computer platform comprising a processor and including segmentation logic for identifying clusters of similar potential customers who share similar risk characteristics based upon one of a Balanced Iterative Reducing and Clustering using Hierarchies ("BIRCH") algorithm and a Bi-Level Clustering of Mixed ("BILCOM") categorical and numerical data types algorithm to multi-dimensional parameters including at least ten parameters concerning the similar potential customers;
a customization computer platform comprising a processor and including a rules engine and a pricing engine coupled to the segmentation computer platform and a computerized predictive model trained on outcomes and multi-variate prior customer data selected based upon regression analysis to create customized products for potential customers, said computerized predictive model comprising one or more of a neural network, a Bayesian network, expert systems, decision trees, collections of decision trees, support vector machines, and a large number of variables model, said customization computer platform configured to:
analyze the data associated with the plurality of potential customers using the segmentation logic from the segmentation computer platform to:
identify one or more clusters of similar potential customers, wherein said analyzing using the segmentation logic comprises comparing multi-dimensional parameters of the data associated with each of the plurality of potential customers including social media site data relating to the one or more of the plurality of potential customers, and
matching each of the plurality of potential customers to one of the one or more clusters based upon application of a matching algorithm which identifies matches based upon distance between certain metric values of the at least ten parameters associated with each of the plurality of potential customers;

automatically determine, for the each of the one or more clusters of similar potential customers, at least one customized quotation parameter that is common to each customized product created for each similar potential customer of the cluster of similar potential customers, for each similar potential customer, create a customized product, including a customized premium value, based on application of the computerized predictive model to at least the automatically determined customized quotation parameter, and to a weighted social network usage parameter and a weighted geographic location parameter determined by the computerized predictive model, a customized quotation server configured to, for each of the similar potential customers:

generate a customer service script for facilitating interactions with the each of the similar potential customers, the customer service script including data indicative of the customized product for the similar potential customer;

prepopulate data fields of the customer service script with at least some of the data associated with the similar potential customer;

render, for display on a computing device of each of the similar potential customers, a web page including the data indicative of the customized product, and transmit the customer service script to an agent device associated with the similar potential customer.

12. The system of claim 11, wherein the computer processor uses third-party data to analyze the data associated with the plurality of potential customers.

13. The system of claim 11, wherein results associated with the customized products are fed back and used to tune determinations of subsequent customized parameters.

* * * * *